April 7, 1942.   R. W. GRACE   2,279,165
COVER FOR METER ENCLOSURES
Filed May 31, 1938   2 Sheets-Sheet 1

Inventor
Richard W. Grace
By Fraser and Bishop
Attorneys

April 7, 1942.     R. W. GRACE     2,279,165
COVER FOR METER ENCLOSURES
Filed May 31, 1938     2 Sheets-Sheet 2
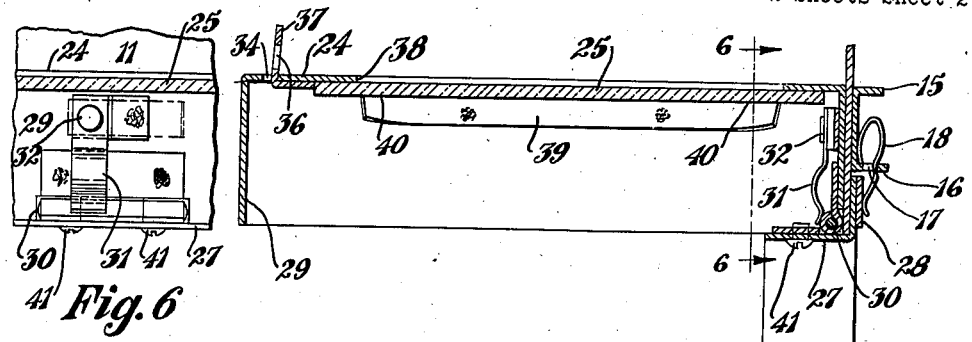
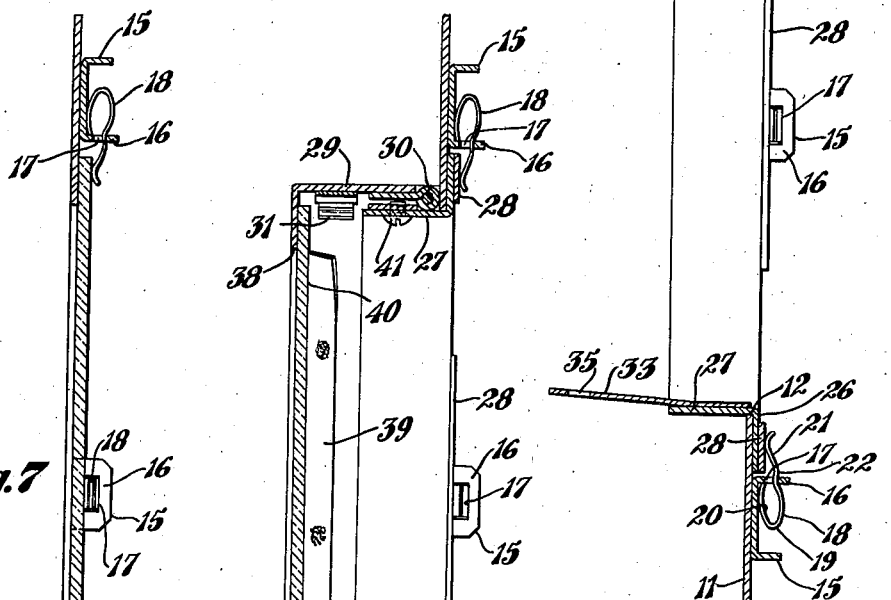
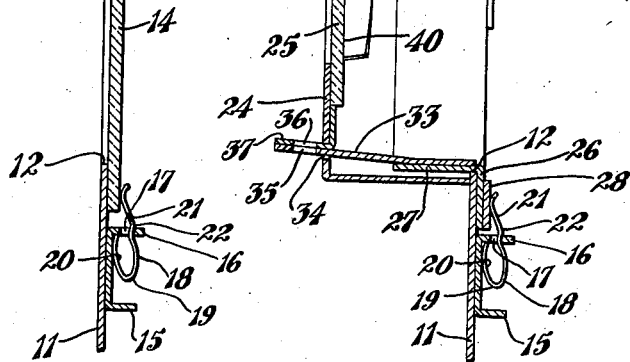
Inventor
Richard W. Grace
By Fraser and Bishop
Attorneys Patented Apr. 7, 1942

2,279,165

UNITED STATES PATENT OFFICE 2,279,165

COVER FOR METER ENCLOSURES

Richard W. Grace, Canton, Ohio, assignor to The Superior Switchboard & Devices Company, Canton, Ohio, a corporation of Ohio Application May 31, 1938, Serial No. 210,929

1 Claim. (Cl. 220—82)

The invention relates to covers for electric meter enclosures and more particularly to a cover adapted to accommodate a demand meter.

A common form of electric meter enclosure now in general use is provided with an opening in its front surface of suitable size and location to display the dials of the ordinary electric meter housed therein, this opening being covered with glass to protect the meter and other devices enclosed within the box.

It frequently happens that it is desirable to place a demand meter within such an enclosure and the present invention concerns a cover for such demand meter which is adapted to be located over the usual opening above referred to, taking the place of the usual meter reading glass and arranged so that this cover may be opened to operate the manual demand reset attachment of the meter without the necessity of opening the entire meter enclosure.

An object of the improvement is to provide a cover for a demand meter so arranged and constructed that it may be installed in the place of the usual meter reading glass.

Another object is to provide a cover of this character which may be independently opened in order to operate the manual demand reset attachment of the meter.

A further object is to provide a novel and simple means for quickly and easily installing the demand reset cover.

A still further object is to provide means for holding the cover in open position while operating the demand reset attachment.

Another object of the improvement is the provision of a novel spring device for holding either the meter reading glass or the demand reset cover in place.

Figure 2:
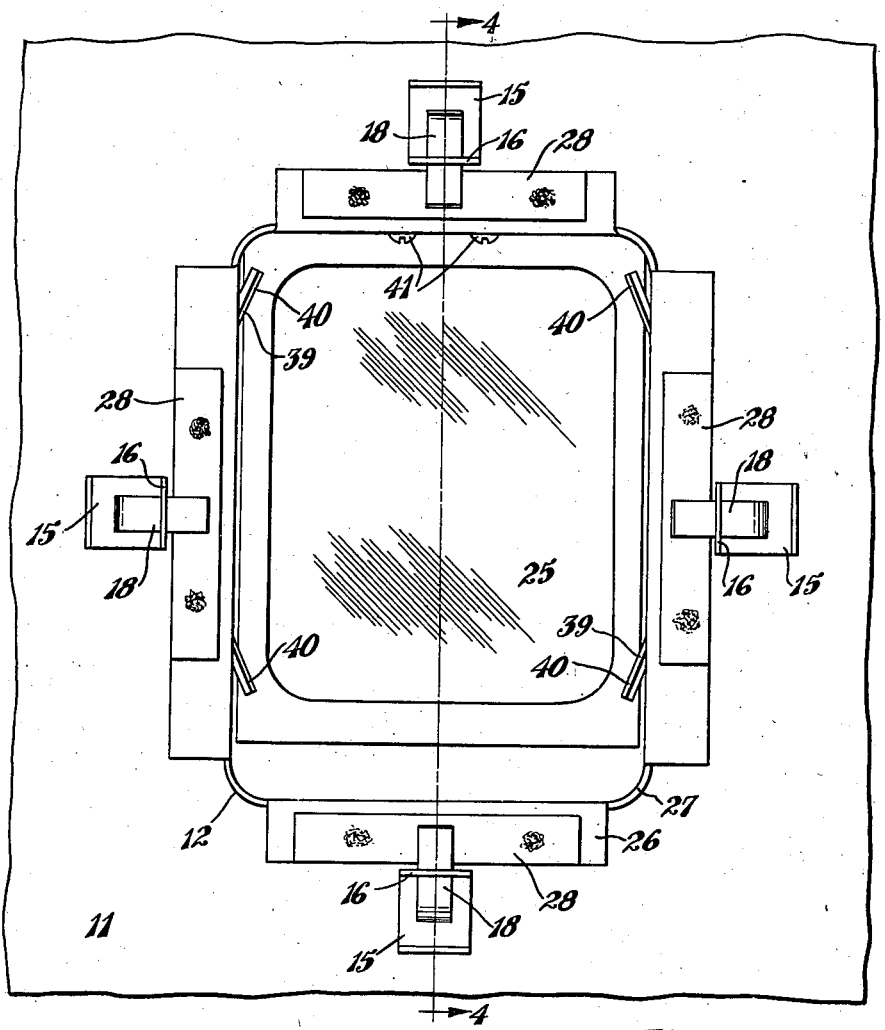
Figure 1:
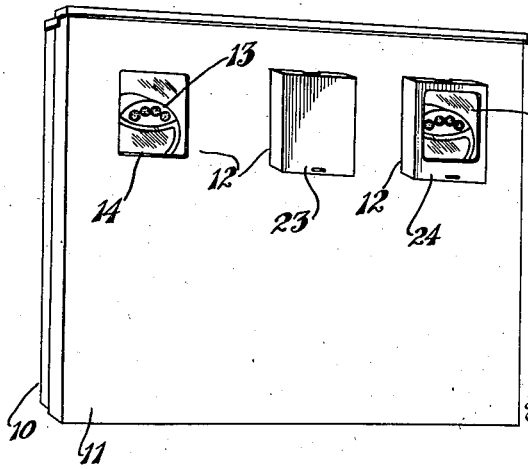
Figure 3:
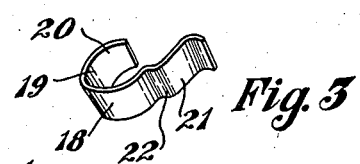

The above objects together with others which will be apparent from the drawings or which may be later referred to may be attained by constructing the improved cover and associated parts in the manner illustrated in the accompanying drawings in which:

Figure 1 is a perspective view of a meter enclosure showing the invention applied thereto;

Fig. 2, a fragmentary elevation of the inside surface of the front wall or cover for the meter enclosure showing the improved demand reset cover installed in the place of the usual meter reading glass;

Fig. 3, a detached perspective view of one of the improved spring clips for attaching the meter reading glass or the demand reset cover;

Fig. 4, a section taken as on the line 4—4, Fig. 2;

Fig. 5, a section similar to Fig. 4 showing the demand reset cover in open position;

Fig. 6, a detail section taken as on the line 6—6, Fig. 5, and

Fig. 7, a sectional view similar to Fig. 4 showing the ordinary meter reading glass installed in place of the demand reset cover.

Similar numerals refer to similar parts throughout the drawings.

The meter enclosure indicated generally at 10 may be of the usual sheet metal construction provided with the removable front wall or cover 11 which may have therein a plurality of openings 12 corresponding to the number of meters to be enclosed.

Where the ordinary electric meter is housed, as indicated at 13, a meter reading glass 14 is located over the corresponding opening 12, the dials of the meter 13 being displayed therethrough.

As shown in Fig. 7 the meter reading glass 14 may be held in place to cover the opening 12 by a simple and easily operated device including the channel shaped brackets 15 spot-welded or otherwise attached to the inner surface of the front wall or cover 11 of the meter box, and located around and spaced from the four sides of the opening 12.

The innermost ear 16 of each of these channel brackets is provided with an aperture 17 through which a spring locking clip indicated generally at 18 is adapted to be inserted.

Each of these spring clips has a U-shaped rear portion 19 adapted to be received between the ears of the channel bracket, the lower leg 20 of the U being considerably shorter than the upper leg 21 which is adapted to be inserted through the aperture 17 in the inner ear 16 of the bracket and which is inclined downward so as to bear upon the glass 14.

A transverse corrugation 22 is formed in the longer leg 21 of the clip and adapted to pass through the aperture 17 when the clip is inserted and to form a stop to prevent accidental displacement of the clip.

It will be seen that the corrugation 22 will prevent movement of the clip in one direction while the end of the lower leg 20 substantially contacting with the ear 16 of the bracket prevents movement of the clip in the opposite direction.

In the meter enclosure shown in Figure 1 is illustrated a case in which three meters may be enclosed within the box, the meter 13 as above stated being the ordinary type of electric meter while two demand meters may be also located within the box the demand reset covers indicated generally at 23 and 24 being installed in the openings 12 in place of the usual meter reading glass.

The demand reset cover 24 differs from the cover 23 only that it is provided with a glass insert 25 to permit reading the meter without opening the cover 24. Otherwise the covers 23 and 24 may be identically the same in construction and operation. For the above reason it is thought necessary to illustrate in detail only the cover 24.

A rectangular frame 26 is provided having an angular flange portion 27 of suitable dimensions to fit within the usual opening 12 of the front wall or cover 11 of the box. As the sheet metal from which this frame is formed is of considerably less thickness than the meter reading glass 14, which it replaces, it may be built up to the same thickness of the glass by spot-welding or otherwise connecting strips 28 of metal to its inner face.

The spring clips 18 may then be used to detachably connect this frame within the opening 12 in the same manner as above described with reference to the meter reading glass 14.

The cover 24 has an angular flange 29 around its edges adapted to fit over the angular flange 27 of the frame 26 and hingedly connected to the upper end of said frame as at 30.

For the purpose of holding the cover in open position, as shown in Fig. 5, when it is necessary to operate the demand reset attachment of the meter, a finger 31 pivoted as at 32 upon the flange of the cover may be swung down into the position shown in Figs. 5 and 6 the free end thereof engaging over the flange 27 of the frame 26.

For the purpose of locking the cover 24 in closed position a hasp 33 may be connected to the lower portion of the flange 27 and adapted to extend through a suitable opening 34 in the front wall of the cover being provided with an aperture 35 arranged to register with an aperture 36 in the hasp 37 carried by the front wall of the cover, whereby a lock or sealing wire may be located through the apertures 35 and 36.

The glass panel 25 may be mounted over the meter reading opening 38 in the front wall of the cover 24 and may be connected thereto as by putty or the like and in order to further assist in preventing displacement of the glass panel a metal strip 39 may be spot-welded or otherwise connected to each side flange 29 of the cover, the free ends thereof being bent over the edges of the glass as shown at 40.

From the above it will be seen that whenever it is necessary to operate the manual demand reset attachment of either one of the demand meters it is not necessary to open the entire front wall or cover of the meter box but only necessary to raise the cover 23 or 24 of the particular demand meter which it is desired to reset.

It will also be seen that the improved demand reset cover may be quickly and easily installed in place of the usual meter reading glass of the ordinary meter enclosure or box.

In removing the meter reading glass and installing the demand reset cover in place thereof the screws 41 which attach the hinge 30 to the flange 27 of the frame 26, are removed so that the cover may be removed from the frame. The frame may then be inserted through the opening 12 from the inside of the cover or front wall 11 of the meter box and the spring clips may then be inserted in place to hold the frame attached to the cover 11.

The cover 23 or 24 as the case may be is then placed in position over the flange 27 and the hinge 30 attached to said flange by the screws 41, the demand reset cover being then in position for use.

I claim:

A meter enclosure having a front wall provided with an opening, a closure member for the opening having a portion extending beyond the opening and fitting against the inner side of the front wall, an angular flange upon said closure member extending through said opening, a cover having an angular flange around its edges fitting over the angular flange of the closure member, one edge portion of the cover flange being hingedly connected to the flange of the closure member, perforate ears mounted upon the inner side of said front wall surrounding said opening, spring clips located through said perforate ears and engaging over said closure member, each spring clip being of U-shape with a short leg adapted to substantially contact the side of said perforated ear opposite said opening, and a long leg extending through said perforated ear and in clamping engagement with said closure member and having a transverse corrugation intermediate its ends anchoring said clip in said ear.

RICHARD W. GRACE.